United States Patent [19]
Burchard et al.

[11] 3,861,705
[45] Jan. 21, 1975

[54] SHIFTING GEAR FOR THE STEERING SYSTEM OF VEHICLE WHEELS

[75] Inventors: Peter Burchard, Korb; Adolf Schreiber, Maubach, both of Germany

[73] Assignee: Daimler-Benz Aktiengesellschaft, Stuttgart-Unterturkheim, Germany

[22] Filed: Nov. 9, 1971

[21] Appl. No.: 196,984

[30] Foreign Application Priority Data
Nov. 11, 1970 Germany............................ 2055364

[52] U.S. Cl.................... 280/91, 74/469, 192/71, 280/93
[51] Int. Cl............................................. B62d 7/00
[58] Field of Search............ 280/91, 87 R, 87 A, 93; 192/71, 79; 292/336

[56] References Cited
UNITED STATES PATENTS

| | | | |
|---|---|---|---|
| 2,354,830 | 8/1944 | Reid...................................... | 280/91 |
| 2,813,608 | 11/1957 | Caburet................................ | 192/71 |
| 3,075,784 | 1/1963 | Beyerstedt........................... | 280/91 |
| 3,236,348 | 2/1966 | Okcuoglu.............................. | 192/71 |
| 3,414,286 | 12/1968 | Muller et al. ........................ | 280/91 |
| 3,532,178 | 10/1970 | Lindbom............................... | 280/91 |

*Primary Examiner*—David Schonberg
*Assistant Examiner*—John P. Silverstrim
*Attorney, Agent, or Firm*—Craig & Antonelli

[57] ABSTRACT

A shifting mechanism for the steering system of vehicle wheels, especially of motor vehicles, with a multi-axle steering system, which permits a selective engagement and disengagement of the individual wheels or wheel groups to the steering gear or from the steering gear, and which includes a pivot member connected with the steering gear and a pivot member connected with the steering linkage which are arranged coaxially to one another while a coupling lever connected to one of these two pivot members is pivotally supported at the other of the two pivot members and is provided with coupling means to achieve the engagement.

31 Claims, 3 Drawing Figures

PATENTED JAN 21 1975  3,861,705

SHIFTING GEAR FOR THE STEERING SYSTEM OF VEHICLE WHEELS

The present invention relates to a shifting mechanism for the steering system of vehicle wheels, especially of motor vehicles with a multiaxle steering system, providing a selective uncoupling and coupling of the steering system of individual wheels or wheel groups from and to the steering gear.

The aim of the present invention is such a construction of the shifting gear that the latter operates reliably and troublefree also with large and heavy vehicles and thus at the large occurring forces, and which permits with a simple actuation a relatively simple construction which is structurally as compact as possible. Accordingly, the present invention essentially resides in that a pivot member connected with the steering gear and a pivot member connected with the steering linkage of the sheel or wheels adapted to be coupled or uncoupled are arranged coaxially to one another and in that a coupling lever is pviotally supported at one of these two pivot members which includes coupling or clutching elements for the coupling with the other of the two pivot members or with a vehicle or axle part.

Preferably the coupling lever is pivotally supported at the pivot member connected with the steering linkage of the wheel or wheels adapted to be uncoupled or coupled and is provided with coupling elements for the selective engagement with the other pivot member, on the one hand, and for the locking of the first mentioned pivot memeber at a fixed vehicle or axle part. Due to this alternate coupling of the coupling lever with the other pivot member—i.e., with the other pivot member not carrying the coupling lever—which acts as entrainment member, and with a relatively fixed part, the steering systems of those wheels or wheel groups which are not to be steered are thus automatically locked against deflections so that undesirable steering movements of the wheels or wheel groups disconnected from the steering gear are precluded. Additional mechanisms for the stopping and locking of these steering systems are thus economized.

Preferably the pivot axis of the coupling lever extends parallel to the axis of the pivot members so that the coupling lever carries out its movement in the pivot plane of the pivot members and a simple, space-saving and reliable construction is made possible thereby.

The actuation of the coupling lever takes place appropriately by an auxiliary force, especially by a hydraulic pressure medium. However, the actuation can also take place pneumatically, electrically or in any other known manner, for example, also mechanically.

The coupling of the coupling lever with the parts to be coupled thereto takes place in its simplest manner by claw elements and coordinated groove-like recesses as coupling elements, of which the elements provided at the coupling lever are preferably arranged at the radial inner side and at the radial outer side of the lever.

In order that during the shifting of the shifting mechanism, the latter can also start to function when the shifting members, i.e., the coupling lever and the parts cooperating therewith are in a position which does not permit a coupling, according to a further feature of the present invention, approximatley circularly shaped guide surfaces extending about the axis of the pivot members are provided at the coupling lever and at the pivot member to be coupled thereto or at the stationary part, which guide surfaces adjoin the aforementioned recesses in the circumferential direction, and along which the claw elements can slide until the engagement in the recesses, in case the coupling and countercoupling elements are mutually offset to one another in the circumferential direction.

In order to hold the coupling lever in the one and/or the other end position or in order to be able to bring the same with certainty into these end positions, a detent mechanism may be provided which is subjected to a force-locking action, especially to spring-action. The detent mechanism thereby includes in its simplest manner a wedge-shaped detent element cooperating with a pin-like counter detent element. Such a detent mechanism exercies simultaneously a safety function in case of failure of the shifting force, i.e., for example, of the pressure of the hydraulic shifting system. The detent mechanism which is subjected to the force-locking action, holds in that case the coupling lever and therewith the connected steering system in that condition into which it had been brought prior thereto by the actuating mechanism of the shifting gear.

The present invention may be used for the engagement and disengagement of the steering system of individual vehicle axles or other steering units. However, the present invention is of particular significance for a multi-axle steering system. For this purpose, several pivot members acting as entrainment means may be connected with the steering gear whereby each of the pivot members is adapted to be coupled with a further pivot member connected with the respective steering linkage. The pivot members of the individual axles may be arranged coaxially or separately from one another, for example, on parallel axes.

The present invention enables, for example, in connection with two axles or axle groups, to put one of the two axles or axle groups into a steerable condition whereas the steering system of the other axle or axle group is locked in an adjusted position for straight drive. possibly, however, also both axles or axle groups can be connected with the steering gear up to an all wheel steering system. Vehicles equipped with shifting mechanisms according to the present invention can therefore drive in the one or other direction as desired.

In lieu of a single steering gear, also two steering gears with respectively associated steering systems may be provided which may operate in unison or alternately on the steering systems.

Accordingly, it is an object of the present invention to provide a shifting mechanism for steering systems of motor vehicles, especially of motor vehicles with multi-axle steering systems, which avoids by simple means the aforementioned shortcomings and drawbacks encountered in the prior art.

Another object of the present invention resides in a shifting mechanism for multi-axle steering systems of vehicles which is relatively simple, utilizes structurally simple parts and is reliable in operation.

A further object of the present invention resides in a shifting mechanism for steering systems of motor vehicles of the type described above which can be utilized also for large and heavy-duty vehicles notwithstanding the relatively large forces that occur in the steering systems thereof.

Still a further object of the present invention resides in a shifting mechanism for the steering systems of vehicle wheels which permits a relatively simple and compact construction resulting in considerable spacesaving yet offers great versatility in its control possibilities.

Another object of the present invention is a shifting mechanism for the steering systems of vehicle wheels, especially of motor vehicles with multi-axle steering systems, which permits a driving of the vehicle in either direction without impairing the steerability thereof.

These and other objects, features and advantages of the present invention will become more apparent from the following description when taken in connection with the accompanying drawing which shows, for purposes of illustration only, one embodiment in accordance with the present invention, and wherein.

Figure 1:
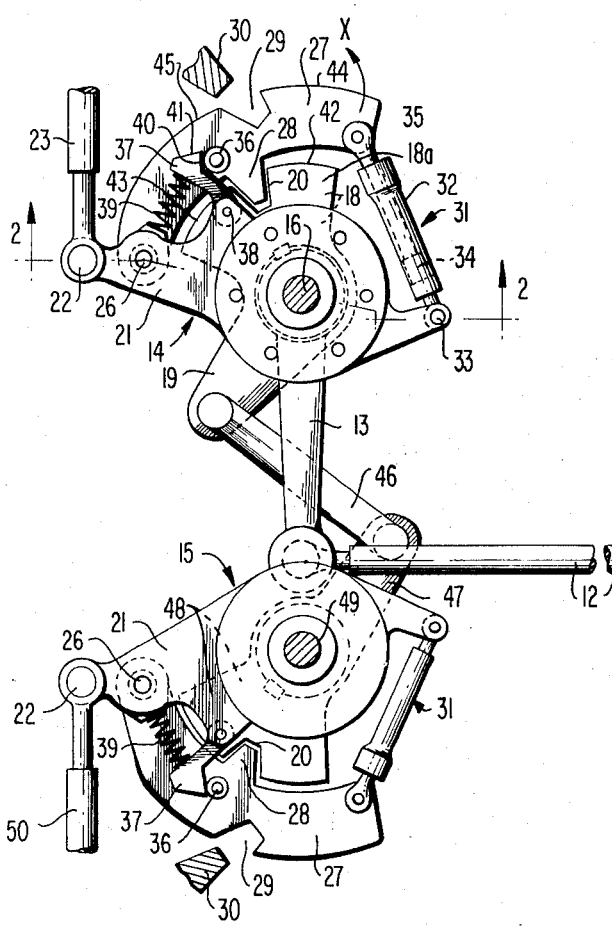
FIG. 1 is a plan view of a shifting mechanism according to the present invention with two shifting mechanisms which are both in the engaged or coupled condition, in cross section taken along line 1—1 of FIG. 2.
Figure 2:
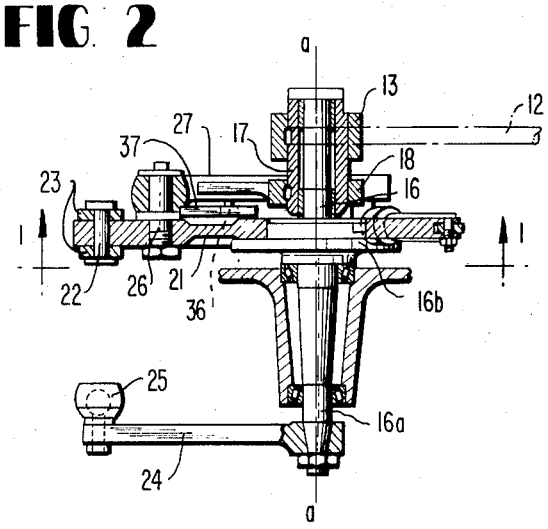
FIG. 2 is a cross sectional view taken along line 2—2 of FIG. 1.

Referring now to the drawing wherein like reference numerals are used throughout the various views to designate like parts, and more particularly to FIGS. 1 and 2, the steering lever 10 of a steering gear 11 which is of conventional construction and is actuated, for example, by means of a steering spindle (not shown) from the driver cab of a motor vehicle, actuates by way of a push-and-pull rod 12, a steering lever 13 which, in its turn, actuates the shifting gears generally designated by reference numerals 14 and 15. A pivot member 18 acting as entrainment member is rigidly connected by way of a bushing 17 with the pivot lever 13 rotatably supported on the shaft 16; the pivot member 18 includes a lever arm 19 and is provided with a groove-shaped recess 20 in an extension 18a thereof.

A further pivot member 21 is rotatably supported on the same shaft 16 as the pivot member 18, which pivot member 21 is rigidly connected with a flange 16b of the shaft 16 as can be seen in particular from FIG. 2. The pivot member 21 is connected by way of a joint 22 with a steering linkage 23 which, for example, leads to the steering system of a front axle. In the illustrated embodiment, a further steering lever 24 is secured on a lower extension 16a of the shaft 16, from which a steering linkage 25 leads, for example, to a further front axle. The two steering linkages 23 and 25 arranged one above the other, can therefore be steered in the illustrated embodiment only in unison. If so desired, however, additional coupling means of any conventional construction may be provided in order to separately disconnect or connect the steering systems connected to the steering linkages 23 and 25 or to couple one of these steering systems to the other or to uncouple it from the other steering system.

A coupling lever 27 is supported at the pivot lever 21 by means of a joint 26; the coupling lever 27 is provided, on the one hand, with a claw element 28 cooperating with the groove-like recess 20 and, on the other, with a groove-like recess 29 which, in its turn, cooperates with a further claw element 30 which, depending on the arrangement of the shifting mechanism, is disposed at a relatively stationary or fixed part, for example, at a vehicle or at an axle part.

The coupling lever 27 is adjusted by a cylinder-piston-unit generally designated by reference numeral 31 (FIG. 1), whose cylinder 32 is pivotally connected by means of a joint 33, for example, at the pivot member 21 and whose piston 34 is pivotally supported by means of joint 35, for example, at the coupling lever 27 in such a manner that by the adjustment of the piston 34 in the cylinder 32, the coupling lever 27 is pivotal about the joint 26 in the direction of arrow $x$. The supply of the cylinder 32 with a pressure medium, for example oil, can take place in any suitable known manner, especially from the driver's seat.

A detent roller 36 (FIG. 1) at the coupling lever 27 cooperates with a detent lever 37 which is supported at the pivot member 21 by means of joint 38. A detent spring 39 stresses the detent lever 37 in such a manner that the latter is forced with its wedging surfaces 40 or 41 against the detent roller 36.

The pivot member 18 is provided on both sides of the groove-like recess 20 with approximately circularly shaped guide surfaces 42 and 43 which cooperate in the manner to be described more fully hereinafter with the claw element 28 at the coupling lever 27.

Similar, approximately circularly shaped guide surfaces 44 and 45 are provided at the radial outer edge of the coupling lever 27 for the cooperation with the fixed claw or locking element 30.

Furthermore, an intermediate guide member 46 (FIG. 1) is pivotally connected at the steering lever 19 of the pivot member 18, whose other end is pivotally connected to a lever arm 47 of a pivot member 48 in such a manner that the pivot member 48 rotatably supported on a shaft 49 carries out a rotary movement opposite to the rotary movement of the pivot member 18, but as to the rest effects that the shifting mechanism 15 is actuated in the same manner as the shifting mechanism 14.

Similar parts of the shifting mechanism 15 are designated with the same reference numerals as those of the shifting mechanism 14. Referring now to the shifting gear 15 illustrated in FIG. 1, the further pivot member 21 can be coupled correspondingly to the pivot member 48 acting as entrainment member by means of the coupling lever 27 by engagement of the claw element 28 into the groove-like recess 20; a steering linkage 50, for example, for the steering system of a rear axle is connected with the pivot member 21 by means of a joint 22. A hydraulic actuating mechanism 31 serves again for the pivotal deflection of the coupling lever 27 in the joint 26, and a detent lever 37 is again forced by a detent spring 39 by means of its wedging surfaces 40 and 41 against a detent roller 36. For the purpose of locking the coupling lever 27, the latter is provided with a groove-like recess 29 which can be brought into engagement with a fixed claw element 30.

As in connection with the shifting mechanism 14, a further steering linkage (corresponding to the steering linkage 25) may also be provided in connection with the shifting mechanism 15, whereby such further steering linkage (not shown) is actuated by an additional steering arm arranged on the shaft 49 (corresponding to element 24 of shifting mechanism 14) and with which is connected, for example, the steering system of a further rear axle.

OPERATION

The operation of the described installation is believed readily apparent from the detailed description given hereinabove. In the position according to FIGS.

1 and 2, both the steering linkages 23 and 25 of one wheel group, for example, of front axles, as also the steering linkage 50 as well as the further possibly provided steering linkage, for example, for the wheels of rear axles are connected to the steering gear 11. The coupling levers 27 by means of the claw elements 28 thereof are in coupling engagement with the pivot members 18 and 48 acting as entrainment means so that the latter are coupled respectively with the associated pivot member 21 connected with a corresponding steering linkage. The pistons 34 of the cylinder-piston-aggregates 31 assume their innermost position in the cylinders 32, and the detent levers 37 abut with the surfaces 40 thereof at the detent rollers 26 whereby the springs 39 exert by way of the wedging surfaces 40 an additional abutment pressure on the coupling levers 27 in a direction opposite the direction of arrow x.

Figure 3:
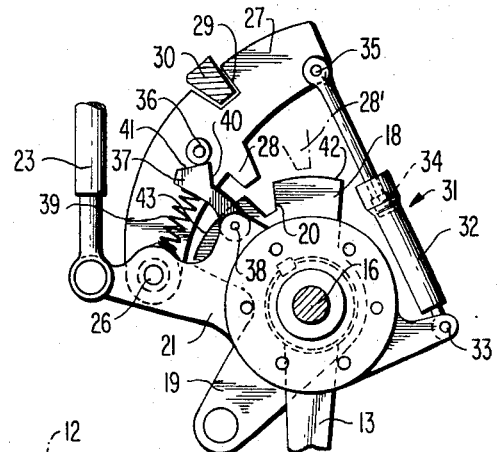
FIG. 3 is a partial plan view similar to FIG. 1, illustrating only one of the two shifting mechanisms with its associated steering system disconnected.

If the steering system of the one or other wheel group is to be disconnected from the remaining steering system, i.e., for example, the steering mechanism 14 is to be shifted to a locked condition, the associated cylinder-piston-unit 31 is fed with pressure medium in such a manner that the piston 34 is forced out of the cylinder 32 and therewith the coupling lever 27 is pivoted about its joint 26 in the direction of arrow x. The claw element 28 is thereby disengaged from the groove-like recess 20 whereas simultaneously the recess 29 is brought into engagement with the fixed, latching claw element 30. The detent lever 37 is forced back during this movement by the detent roller 36 against the effect of the spring 39 until the detent roller 36 comes into contact with the wedging surface 41; the detent lever 37 thereby exerts an additional force on the coupling lever 27 in the direction of arrow x. The end position is illustrated in FIG. 3. The pivot member 21 of the shifting mechanism 14 is then uncoupled from the pivot member 18 taking the same along so that with the actuation of the steering lever 10, only the pivot member 18 is moved in the one or the other direction of rotation whereas the pivot member 21 remains motionless due to the locking action at the locking claw element 30.

If the shifting mechanism 15 has thereby remained non-actuated, and if it assumes a condition illustrated in FIG. 1, then with the actuation of the steering gear the associated pivot member 21 is taken along in the steering direction by the entraining pivot member 48 and therewith the linkage 50 is adjusted for carrying out the desired steering stroke.

If, for example, the pivot members 18 and 21 arranged on the same shaft are pviotally displaced relative to one another in the direction of rotation so that, for example, the claw element 28 assumes relative to pivot member 18 the position 28' illustrated in dash and dot lines in FIG. 3, and if pressure is exerted on the piston 34 in such a manner that the piston 34 is forced into the cylinder 32, then the piston 34 cannot carry out this piston stroke since the coupling claw element 28 in its position 28' abuts against the outer sliding surface 42 at the pivot member 18. The pivot member 18 therefore has to be brought back at first again into its original position, i.e., as a rule, into a straight drive position, until the coupling claw element 28 slides from the position 28' along the sliding surface 42 to the groove-like recess 20 and then can drop into the same.

The same takes place when the coupling lever 27 is pivoted about the axis of the shaft 16 out of the position according to FIG. 1 during a steering actuation by the steering gear 11 and as a result thereof, the recess 29 is displaced out of the area of the fixed claw element 30. If in this condition the piston 34 is forced outwardly by the pressure medium, then the lever 27 can be displaced in the direction of arrow x only for such a length of time until its radial outer sliding surface 44 or 45 abuts at the coupling claw element 30. Also, in this case the shifting mechanism has to be brought back again at first into the center position and the pivot members 18 and 21 must assume together the center position illustrated in FIG. 1 before the recess 29 can come into engagement with the claw element 30.

If the adjusting pressure of the pressure medium actuating the pistons 34 on both sides fails, the detent lever 37 becomes effective in that a portion of the pressure or abutment force is taken over by the springs 39. The wedging surfaces 40 and 41 retain the coupling lever 27 by way of the detent roller 36 either in the end position according to FIG. 1 by means of the wedging surface 40 or in the end position according to FIG. 3 by means of the wedging surface 41. It is thereby assured that the steering system does not become uncontrolled as a result of the failure of the pressure medium and the wheels are not deflected out of their adjusted position by ground obstacles since the claw elements 28 remain in engagement during that time in recesses 20.

As can be seen, the joints 26, 33, 35 and 38 are arranged parallel to the axis of the shaft 16. The individual parts of the shifting installation can therefore be constructed disk or plate-shaped so that altogether a very low construction can be realized.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A shifting mechanism for steering systems of vehicle wheel means, which provides a selective uncoupling and coupling of the steering system of the wheel means from and to a steering gear, comprising: a first pivot member operatively connected with the steering gear, a second pivot member connected with a steering linkage means of the wheel means adapted to be uncoupled and coupled, siad first and second pivot members being arranged substantially coaxially to one another, a coupling lever means pivotally supported at said second pivot member, said coupling lever means including coupling means for selectively coupling said first pivot member and locking said second pivot member at a fixed part, said coupling means consisting of at least one claw element provided on said coupling lever means and at least one recess provided on said first pivot member, said claw element and said recess being adapted to be brought into mutual engagement in the radial direction with respect to the axes of said pivot members to couple said first and second pivot members, guide surface means extending approximately circularly about the axis of said pivot members provided on one of said pivot members for guiding said claw element into engagement with said recess to couple said pivot members, the pivot axis of said coupling lever means extending substantially parallel to the axis of said pivot members, and a cylinder-piston-unit acutated by a pressure medium interconnected between said second pivot member and the coupling lever means for the actuation of the latter.

2. A shifting mechanism for steering systems of vehicle wheel means, which provides a selective uncoupling and coupling of the steering system of wheel means from and to a steering gear, comprising: a first pivot member operatively connected with the steering gear, a second pivot member connected with a steering linkage means of the wheel means adapted to be uncoupled and coupled, said first and second pivot members being arranged substantially coaxially to one another, a coupling lever means is pivotally supported at one of these two pivot members including coupling means for the selective coupling with the other of the two pivot members, and a cylinder-piston means actuated by a pressure medium interconnected between the pivot member carrying the coupling lever means and the coupling lever means for the actuation of said coupling lever means.

3. A shifting mechanism according to claim 2, wherein said coupling lever means is pivotally supported at said second pivot member and said coupling means selectively couples said first pivot member, and locks said second pivot member at a fixed part.

4. A shifting mechanism according to claim 3, wherein said fixed part is a clutch claw.

5. A shifting mechanism according to claim 3, wherein said fixed part is a vehicle part.

6. A shifting mechanism according to claim 5, wherein said vehicle part is an axle part.

7. A shifting mechanism according to claim 3, wherein the pivot axis of the coupling lever means extends substantially parallel to the axis of the pivot members.

8. A shifting mechanism according to claim 2, wherein several pivot members are operatively connected with the steering gear, each of said pivot members being adapted to be selectively connected with a further pivot member connected with a steering linkage means of the wheel means.

9. A shifting mechanism according to claim 2, wherein the vehicle has a multi-axle steering system.

10. A shifting mechanism according to claim 2, wherein the pivot axis of the coupling lever means extends substantially parallel to the axis of the pivot members.

11. A shifting mechanism according to claim 2, wherein said coupling means selectively couple said first pivot member with said second pivot member and selectively locks said second pivot member at a fixed part, said coupling means for coupling said second pivot member with said first pivot member being arranged at the radially inner side relative to the pivot axis of said coupling lever means and the coupling means for coupling said second pivot member with the fixed part being arranged at the radial outer side of said coupling lever means.

12. A shifting mechanism according to claim 11, wherein said coupling lever means is displaceable between two end positions, and wherein a detent means under force-locking action is provided for retaining said coupling lever means in at least one of said end positions.

13. A shifting mechanism according to claim 12, wherein said detent means holds said coupling lever means in both end positions.

14. A shifting mechanism according to claim 13, wherein said detent means is under spring action.

15. A shifting mechanism according to claim 2, wherein said coupling lever means is displaceable between two end positions and wherein a detent means under force-locking action is provided for retaining said coupling lever means in at least one of said end positions.

16. A shifting mechanism according to claim 15, wherein said detent means holds said coupling lever means in both end positions.

17. A shifting mechanism according to claim 15, wherein said detent means is under spring action.

18. A shifting mechanism for steering systems of vehicle wheel means, which provides a selective uncoupling and coupling of the steering system of wheel means from and to a steering gear, comprising: a plurality of first pivot members operatively connected with the steering gear, each of said pivot members being adapted to be selectively connected with a second pivot member connected with a steering linkage means of the wheel means, a coupling lever means pivotally supported at one of these pivot members including engaging means for the selective coupling with the other of the pivot members, said first pivot members, of which one pivot member is coordinated to the wheel means of one axle and the other pivot member to the wheel means of the other axle, being arranged on parallel axes and connected with each other by way of a reversing gear means.

19. A shifting mechanism according to claim 18, wherein said reversing gear means includes a connecting member connected to the respective pivot members to produce movements thereof in opposite directions of rotation.

20. A shifting mechanism for steering system of vehicle wheel means, which provides a selective uncoupling and coupling of the steering system of wheel means from and to a steering gear, comprising: a first pivot member operatively connected with the steering gear, a second pivot member connected with a steering linkage means of the wheel means adapted to be uncoupled and coupled, said first and second pivot members being arranged substantially coaxially to one another, a coupling lever means pivotally supported at one of these two pivot members including engaging means for the selective coupling with the other of the two pivot members, said coupling lever means being displaceable between two end positions, and a detent means under force-locking action for retaining the coupling lever means in at least one of said end positions, said detent means including a wedge-shaped detent member cooperating with a pin-shaped counter detent element.

21. A shifting mechanism according to claim 20, wherein said counter detent element is a roller.

22. A shifting mechanism for steering systems of vehicle wheel means, which provides a selective uncoupling and coupling of the steering system of wheel means from and to a steering gear, comprising: a first pivot member operatively connected with the steering gear, a second pivot member connected with a steering linkage means of the wheel means adapted to be uncoupled and coupled, said first and second pivot members being arranged substantially coaxially to one another, a coupling lever means pivotally supported at one of these two pivot members including engaging means for the selective coupling with the other of the two pivot members, said coupling lever means being displaceable between two end positions and a detent means under force-locking action for retaining the coupling lever means in at least one of said end positions said detent means including a detent lever forming said detent member provided with wedging surfaces, said detent lever pivotally supported at the pivot member carrying the coupling lever means.

23. A shifting mechanism for steering systems of vehicle wheel means, which provides a selective uncoupling and coupling of the steering system of wheel means from and to a steering gear, comprising: a first pivot member operatively connected with the steering gear, a second pivot member connected with a steering linkage means of the wheel means adapted to be uncoupled and coupled, said first and second pivot members being arranged substantially coaxially to one another, a coupling lever means pivotally supported at one of these two pivot members, said coupling lever means including coupling means for selective coupling with the other of the two pivot members, said coupling means consisting of at least one claw element provided on said coupling lever means, and at least one recess provided on the other of the two pivot members, said claw element and said recess being adapted to be brought into mutual engagement in the radial direction with respect to an axis of said pivot members to couple said first and second pivot members, guide surface means extending approximately circularly about the axis of said pivot members provided on one of said pivot members for guiding said claw element into engagement with said recess to couple said pivot members, and a cylinder-piston-unit actuated by a pressure medium interconnected between the pivot member carrying the coupling lever means and the coupling lever means for the actuation of the latter.

24. A shifting mechanism for steering systems of vehicle wheel means, which provides a selective uncoupling and coupling of the steering system of wheel means from and to a steering gear, comprising: a first pivot member operatively connected with the steering gear, a second pivot member connected with a steering linkage means of the wheel means adapted to be uncoupled and coupled, said first and second pivot members being arranged substantially coaxially to one another, a coupling lever means pivotally supported at one of these two pivot members, said coupling lever means including coupling means for selectively coupling said pivot member supporting said coupling lever means with a fixed part and for selectively coupling said first and second pivot members, said coupling means consisting of at least one claw element provided on said coupling lever means, and at least one recess provided on the other of the two pivot members, said claw element and said recess adapted to be brought into mutual engagement in the radial direction with respect to an axis of said pivot members to couple said first and second pivot members, and guide surface means extending approximately circularly about the axis of said pivot members provided on one of said pivot members for guiding said claw element into engagement with said recess to couple said pivot members, said coupling means for the coupling of said second pivot member with said first pivot member being arranged at the radially inner side relative to the pivot axis of said coupling lever means and the coupling lever means for the coupling of said pivot member supporting said coupling lever means with the fixed part being arranged at the radial outer side of said coupling lever means.

25. A shifting mechanism for steering systems of vehicle wheel means, which provides a selective uncoupling and coupling of the steering system of wheel means from and to a steering gear, comprising: a first pivot member operatively connected with a steering gear, a second pivot member connected with a steering linkage means of the wheel means adapted to be uncoupled and coupled, said first and second pivot members being arranged substantially coaxially to one another, a coupling lever means pivotally supported at said second pivot member provided with a coupling means for selectively coupling said first pivot member with said second pivot member and for selectively locking said second pivot member at a fixed part, said coupling lever means being displaceable between two end positions, the pivot axis of said coupling lever means extending substantially parallel to the axis of said pivot members, a cylinder-piston unit actuated by a pressure medium interconnected between said second pivot member and said coupling lever means for actuation of the latter, said coupling lever means including coupling means consisting of claw elements and groove-like recesses adapted to be brought into mutual engagement in the radial direction with respect to the axis of said pivot members, the coupling means for coupling of said second pivot member with said first pivot member being arranged at the radially inner side relative to the pivot axis of said pivot members and the coupling means for selectively locking said second pivot member with the fixed part being arranged at the radial outer side relative to the pivot axis of said pivot members, guide surfaces extending approximately circularly about the axis of said pivot members and adjoining a respective coupling means being arranged at two parts consisting of said coupling lever means, said first pivot member cooperating therewith and with the fixed part, thereby allowing said claw elements to slide along said guide surfaces to the point of engagement in the respective recess, in case a respective claw element and recess are mutually displaced in the circumferential direction, a detent means under force-locking action for retaining under spring action said coupling lever means in both of said end positions, said detent means including a wedge-shaped detent member cooperating with a pin-shaped counter detent element.

26. A shifting mechanism according to claim 25, wherein said counter detent element is a roller.

27. A shifting mechanism according to claim 26, wherein said detent member consists of a detent lever provided with wedging surfaces, said detent member being pivotally supported at said second pivot member.

28. A shifting mechanism according to claim 27, wherein several pivot members are operatively connected with the steering gear, each of said pivot members being adapted to be selectively connected with a further pivot member connected with a steering linkage means of the wheel means.

29. A shifting mechanism according to claim 28, wherein the pivot members connected with the steering gear, of which one pivot member is coordinated to the wheel means of one axle and the other pivot member to the wheel means of the other axle, are arranged on parallel axes and are connected with each other by way of a reversing gear means.

30. A shifting mechanism according to claim 29, wherein said reversing gear means includes a connecting member connected to the respective pivot members to produce movements thereof in opposite directions of rotation.

31. A shifting mechanism according to claim 30, wherein the vehicle has a multi-axle steering system.

* * * * *